United States Patent
Wang et al.

(10) Patent No.: US 10,757,601 B2
(45) Date of Patent: Aug. 25, 2020

(54) PHYSICAL LAYER PROCEDURES FOR USER EQUIPMENT IN POWER SAVING MODE

(71) Applicant: AT&T Intellectual Property I, L.P., Atlanta, GA (US)

(72) Inventors: Xiaoyi Wang, Austin, TX (US); Arunabha Ghosh, Austin, TX (US); Milap Majmundar, Austin, TX (US); Salam Akoum, Austin, TX (US); SaiRamesh Nammi, Austin, TX (US); Thomas Novlan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 120 days.

(21) Appl. No.: 15/840,068

(22) Filed: Dec. 13, 2017

(65) Prior Publication Data

US 2019/0182702 A1  Jun. 13, 2019

(51) Int. Cl.
*H04W 28/02* (2009.01)
*H04W 72/12* (2009.01)
*H04W 52/02* (2009.01)
*H04W 74/08* (2009.01)

(52) U.S. Cl.
CPC ... *H04W 28/0221* (2013.01); *H04W 52/0209* (2013.01); *H04W 52/0261* (2013.01); *H04W 72/1268* (2013.01); *H04W 74/0833* (2013.01)

(58) Field of Classification Search
None
See application file for complete search history.

(56) References Cited

U.S. PATENT DOCUMENTS

| | | |
|---|---|---|
| 6,345,180 B1 | 2/2002 | Reichelt |
| 9,107,163 B2 | 8/2015 | Hofmann et al. |
| 9,253,729 B1* | 2/2016 | Sundar .............. H04W 52/0261 |
| 9,357,500 B2 | 5/2016 | Chen et al. |
| 9,439,206 B2 | 9/2016 | Hofmann et al. |
| 9,526,033 B2 | 12/2016 | Han et al. |
| 9,572,109 B2 | 2/2017 | Spero et al. |
| 2007/0057767 A1* | 3/2007 | Sun ....................... G06F 1/3228 340/7.35 |
| 2007/0291673 A1 | 12/2007 | Demirhan et al. |
| 2008/0057894 A1 | 3/2008 | Aleksic et al. |
| 2011/0081858 A1* | 4/2011 | Tolentino ............... H04B 15/00 455/41.2 |

(Continued)

OTHER PUBLICATIONS

International Search Report and Written Opinion dated Feb. 28, 2019, for International Application No. PCT/US2018/062397. 13 pages.

*Primary Examiner* — Adnan Baig
(74) *Attorney, Agent, or Firm* — Amin, Turocy & Watson, LLP

(57) ABSTRACT

A user equipment can send a notification to a network node indicating that the user equipment is entering a battery saving mode of operation. Reduced physical layer procedures can be implemented based on reduced capabilities indicated by the user equipment. Reduced physical layer procedures can also be implemented based on the network node's reconfiguration of parameters to facilitate the activation of the reduced physical layer procedures. The user equipment can also send to the network node recommendations of reduced physical layer procedures.

20 Claims, 11 Drawing Sheets

(56) References Cited

U.S. PATENT DOCUMENTS

| | | |
|---|---|---|
| 2013/0051264 A1 | 2/2013 | Wang et al. |
| 2013/0089091 A1 | 4/2013 | Diab |
| 2013/0215811 A1 | 8/2013 | Takaoka et al. |
| 2013/0223308 A1 | 8/2013 | Chandra et al. |
| 2014/0003311 A1* | 1/2014 | Chin ................. H04W 52/0254 370/311 |
| 2014/0157017 A1* | 6/2014 | Zhang ................. H04B 7/0452 713/320 |
| 2015/0205339 A1 | 7/2015 | Park et al. |
| 2015/0282068 A1* | 10/2015 | Rajagopal ......... H04W 52/0206 370/350 |
| 2016/0105264 A1* | 4/2016 | Chen ....................... H04W 4/70 370/329 |
| 2016/0135127 A1* | 5/2016 | Vyas ................. H04W 52/0264 370/311 |
| 2016/0295555 A1 | 10/2016 | Cheng et al. |
| 2016/0323829 A1 | 11/2016 | Zhang et al. |
| 2016/0360489 A1* | 12/2016 | Boodannavar ....... H04B 7/0413 |
| 2017/0013611 A1 | 1/2017 | Dinan |
| 2017/0285621 A1* | 10/2017 | Pradas .................... H04W 8/22 |
| 2017/0303248 A1* | 10/2017 | Chatterjee ............... H04L 1/189 |
| 2018/0132257 A1* | 5/2018 | Golitschek Edler von Elbwart ................ H04L 5/1469 |
| 2019/0007906 A1* | 1/2019 | Hessler ................ H04W 16/28 |

\* cited by examiner

PHYSICAL LAYER PROCEDURES FOR USER EQUIPMENT IN POWER SAVING MODE

TECHNICAL FIELD

The present application relates generally to energy management in a user equipment, and, more specifically, to implementation of reduced physical layer procedures for user equipment in power saving mode.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including among others mobile broadband (MBB) and machine type communications (e.g., involving Internet of Things (IOT) devices).

In the face of advancements in networking, the long-standing issue of battery consumption by user equipment (UEs) can have a direct impact on the user experience. At the device level, "power saving mode" or "battery saving mode" is an optimization scheme widely adopted in different smart phone operation systems. The operation system (OS) of the UE identifies the remaining charge left in the battery, and when the battery level is below a certain threshold, the OS triggers a power saving mode causing the UE to perform certain actions on the device to prolong the battery life (or slow down the battery's drain). Currently, UEs in power saving mode can prolong battery life by reducing the animation effect, lowering the screen brightness, closing device applications, preventing device applications from running (e.g., not allowing the camera to be used when the battery charge is too low), or reducing the network inquiries for all applications (e.g., notifications, etc.).

The above-described background relating to wireless networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

The following description and the annexed drawings set forth in detail certain illustrative aspects of the subject matter. However, these aspects are indicative of but a few of the various ways in which the principles of the subject matter can be implemented or employed. Other aspects, advantages, and novel features of the disclosed subject matter will become apparent from the following detailed description when considered in conjunction with the provided drawings. In the following description, for purposes of explanation, numerous specific details are set forth to provide a understanding of the subject disclosure. It may be evident, however, that the subject disclosure may be practiced without these specific details. In other instances, well-known structures and devices are shown in block diagram form in order to facilitate describing the subject disclosure. For example, the methods (e.g., processes and logic flows) described in this specification can be performed by devices (e.g., a user equipment (UE), a network node device, etc.) comprising programmable processors that execute machine executable instructions to facilitate performance of operations described herein. Examples of such devices can be devices comprising circuitry and components as described in FIG. 10 and FIG. 11.

The present patent application relates to reduced (or some might use the term simplified) physical layer communications procedures (reduced physical layer communications procedures) that can be implemented when a user equipment (UE) enters a battery power saving mode of operation. Example reduced physical layer procedures (also referred to as physical layer communications procedures) can be implemented based on reduced capabilities indicated by the UE. Example embodiments of reduced physical layer procedures can also be implemented based on the network node's reconfiguration of parameters to facilitate the activation of the reduced physical layer communications procedures, once the network node is notified by the UE that it is entering a battery saving mode. In example embodiments, the UE can also send to the network node recommendations of reduced physical layer procedures, which the network node can accept in whole or part, reject, or add to.

Figure 1:
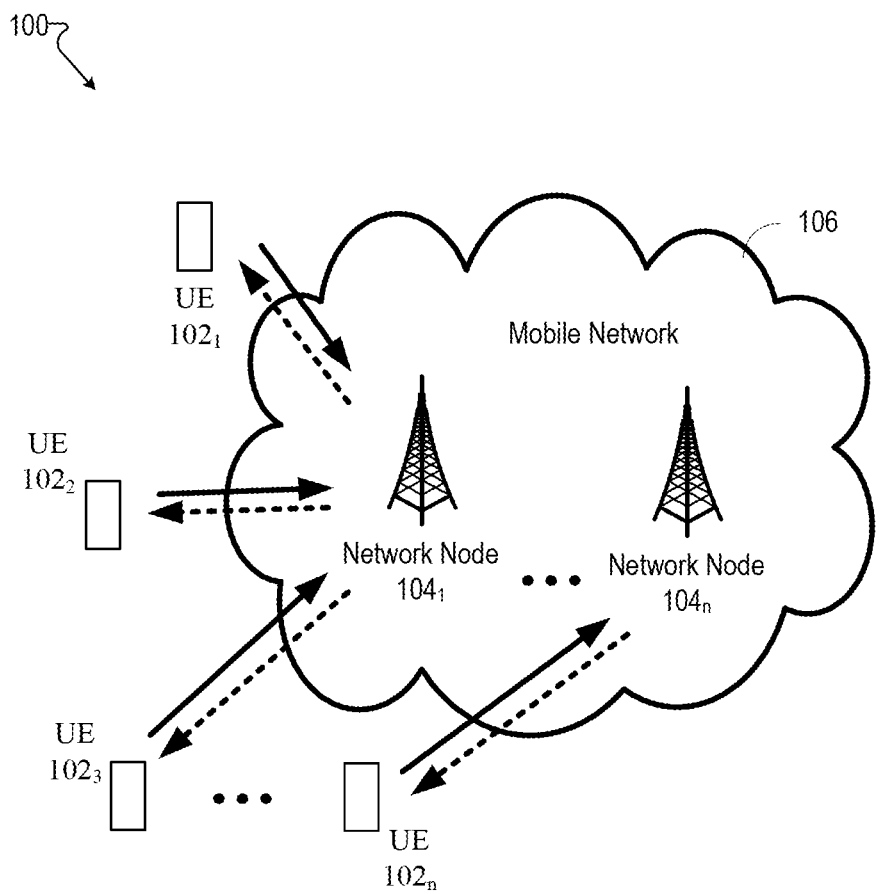
FIG. 1 illustrates an example wireless communication system which a network node device (e.g., network node) communicates with user equipment (UEs), or user devices, in accordance with various aspects and embodiments of the subject disclosure.

FIG. 1 illustrates an example mobile communication system 100 (also referred to as mobile system 100) in accordance with various aspects and embodiments of the subject disclosure. In example embodiments (also referred to as non-limiting embodiments), mobile system 100 can comprise a mobile (also referred to as cellular) network 106, which can comprise one or more mobile networks typically operated by communication service providers (e.g., mobile network 106). The mobile system 100 can also comprise one or more user equipment (UE) $102_{1-n}$ (also referred to as user devices). The UEs $102_{1-n}$ can communicate with one another via one or more network node devices (also referred to as network nodes) $104_{1-n}$ (referred to as network node 104 in the singular) of the mobile network 106. The dashed arrow lines from the network nodes $104_{1-n}$ to the UE $102_{1-n}$ represent downlink (DL) communications and the solid arrow lines from the UE $102_{1-n}$ to the network nodes $104_{1-n}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, mobile network 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers. For example, mobile system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay, a donor node controlling relay, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Figure 2:
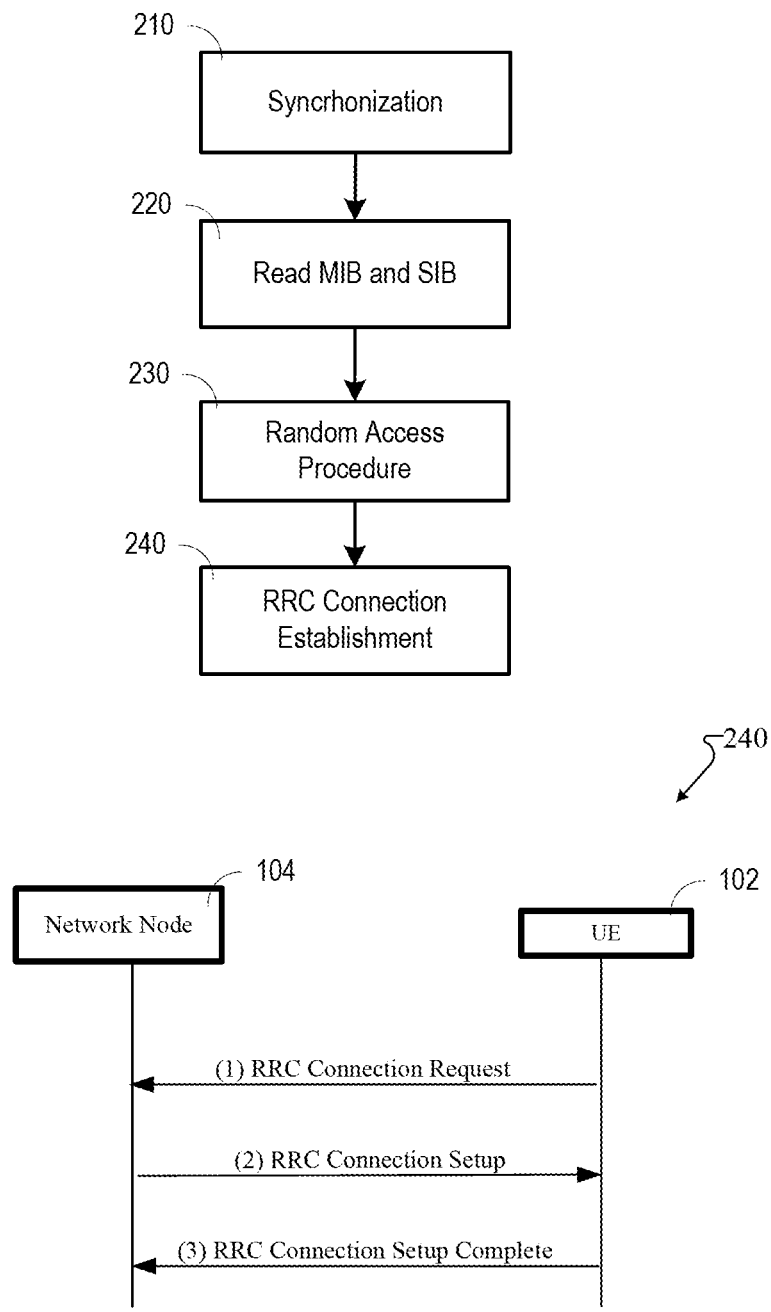
FIG. 2 illustrates an example of a radio resource control (RRC) signaling and establishment process, in accordance with various aspects and embodiments of the subject disclosure.

FIG. 2 illustrates a process for radio resource control (RRC) connection establishment. Such a process is implemented, for example, in an LTE network. Functions of the RRC protocol include, for example, connection establishment and release functions, broadcast of system information, radio bearer establishment, reconfiguration and release, RRC connection mobility procedures, paging notification and release, and outer loop power control. Using signaling functions the RRC can configure the user and control planes according to the network status and enable the implementation of Radio Resource Management (RRM) strategies. If a UE (e.g., UE 102) needs resources (for example, for a circuit switched or packet switched call), it can request the resources from the network. In order to do these, a typical UE first engages in a RCC connection establishment procedure, as illustrated in FIG. 2.

After being switched on, at step 210, the UE synchronizes to each frequency and checks whether that frequency is from the correct operator to which it wants to connect. Once synchronized, the UE at step 220 reads the master information block (MIB) and system information blocks (SIBs). The process then proceeds to the random access procedure at step 230, in which the network for the first time knows that the UE is trying to access the network, so the network provides temporary resources to the UE for initial communication. Once the random access procedure is completed, next is the RRC connection establishment procedure 240 which lets the UE inform the network as to what exactly it wants (e.g., Attach, Service Request, Tracking area update etc.).

Still referring to FIG. 2, RRC connection establishment 240 is a three-way handshake procedure comprising a RRC connection request, RRC connection setup, and RRC connection setup complete. In the RRC connection request, the UE provides its identity and the cause for the connection establishment. The RRC connection setup message contains configuration details for a signaling radio bearer (e.g., SRB1) so that later messages can be transferred via the signaling radio bearer.

Different amounts of radio resources available to a UE can be associated with different RRC states. Since different amounts of resources are available at different states, the quality of the service that the user experiences, and the energy consumption of the UE, are impacted by these RRC states. In accordance with example embodiments herein, RRC signaling can be used to activate/de-activate and configure reduced physical layer procedures for the UE when the UE indicates that it is in a power saving mode.

As mentioned above, by entering power saving mode, the UE can save a lot of energy consumption with reduced animation, lower screen brightness, etc. This optimization, however, is mainly on application layer, and in the current LTE physical layer design, no physical layer optimization has been considered for the low power mode UE. In other words, a current LTE UE may enter power saving mode, but the operations on the physical layer are still carried out in a normal fashion until the UE no longer has enough battery charge to engage in any communications with the network. Even in a power saving mode, at the physical layer for transmissions, a UE is still required to perform full blind decoding on the physical downlink control channel (PDCCH) (44 times of blind decoding), still required to prepare to receive physical downlink shared channel (PDSCH) transmissions using the maximum MIMO layers, adhere to the transport block size as indicated in a UE capability message, etc. Similarly, the UE is still required to transmit on the physical uplink share channel (PUSCH) at a higher transmit power, etc. In short, the operations at the physical layer for communications between the UE and the network node do not consider the life of the battery (in other words, whether the battery is low of charge).

In accordance with various aspects and embodiments of the subject disclosure, a UE can indicate (e.g., using RRC signaling) that it is in a "power saving mode" to the network to request or determine the activation of reduced physical layer procedures (with reduced performance). Once a battery's charge has dropped to a certain threshold (dipped below a certain threshold, decreased below a threshold, transitions a threshold level of charge, etc.), the operating system module of the UE, or a module at the general application layer of the UE, can facilitate the sending of a message to the network (e.g., to the network node) to inform that it is entering a power saving mode. Following such signaling, network and UE can negotiate and hand-shake on the details of the reduced procedures. Several example embodiments can enable the activation of the reduced physical layer procedures, with differences in the embodiments primarily related to which device (e.g., the UE or the network node) determines the reduced physical layer procedures, which physical layer procedures are to be reduced, and the details of the reduced procedures to be implemented.

Figure 3:
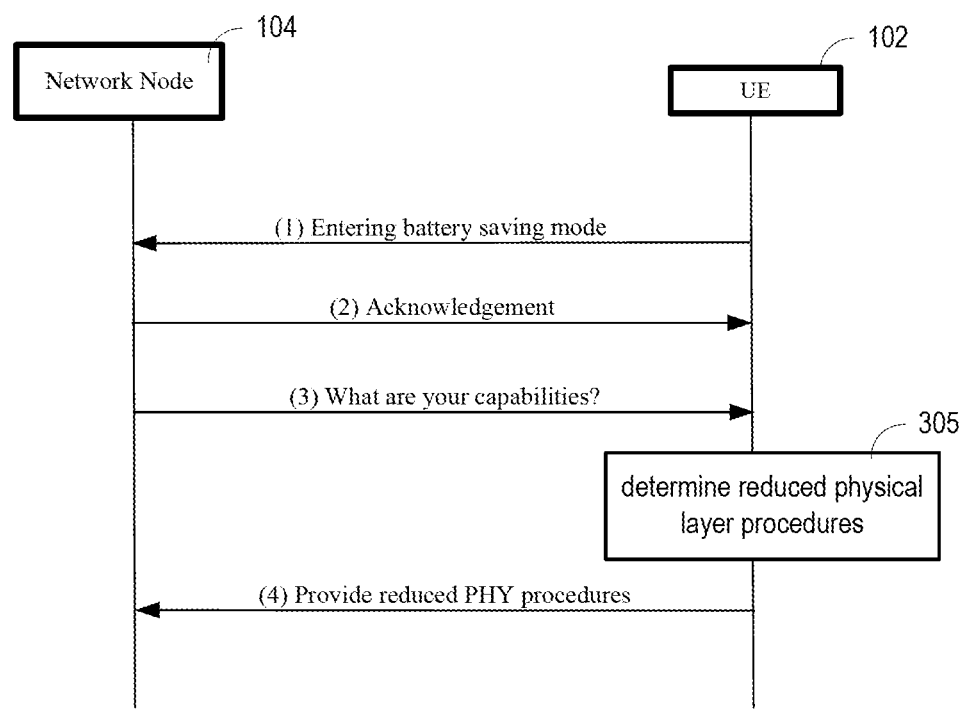
FIG. 3 illustrates a transaction diagram of an example in which a user equipment (UE) can determine a reduced set of physical layer operating capabilities when the UE is in a battery saving mode of operation, in accordance with various aspects and embodiments of the subject disclosure.

FIG. 3 describes an example transaction wherein a UE (e.g., UE 102) can decide what reduced physical layer procedures should be implemented when it is in a power saving mode. A UE can detect a decrease in the level of charge of its battery that transitions a threshold level (or, decreases to a threshold level). In example embodiments, this detection can be facilitated by a software application (or software module) residing in the UE (e.g., at the application layer). In response to the decrease in the level of charge, the UE can facilitate transmitting a first notification to a network node (e.g., network node 104) that the UE is entering a battery saving mode of operation. For example, referring to FIG. 3, at transaction (1), a UE can transmit a signal (e.g., an RRC signal), indicating to the network (e.g., network node 104) that it is entering a battery saving mode. In response to the signal from the UE that the UE is entering the battery saving mode, the network node can trigger a UE capability inquiry signaling. At transaction (2), the network node can acknowledge receipt of the notification that the UE is entering a battery saving mode of operation. At transaction (3), for example, the network node can send a signal to the UE inquiring as to what its physical layer capabilities are. In some example embodiments, the acknowledgement and the signal inquiring of the UE's capabilities can be sent as one transaction. In response, the UE can at stage 305 determine a reduced group of physical layer operating capabilities smaller than a current group of physical layer operating capabilities (the current group being associated with the non-battery saving mode). As an example, the reduced group of physical layer operating capabilities can be related to transmissions on a physical uplink channel (e.g., a physical uplink shared channel (PUSCH), a physical uplink control channel (PUCCH), etc.) from the user equipment to the network device. The reduced group of physical layer operating capabilities can also be related to a physical downlink channel (e.g., a physical downlink shared channel (PDSCH), a physical downlink control channel (PDCCH), etc.) from the network device to the user equipment. As another example, they can also be related to a channel state information feedback process (e.g., a CSI feedback procedure) that determines parameters related to a protocol for the transmissions. And as another example, the reduced procedures can also relate to radio resource management measurements that monitor signals for a quality of the transmissions (e.g., an RRM related procedure). Example embodiments of reduced physical layer procedures (e.g., carrier aggregation related procedure, carrier dual connectivity related procedure, and higher layer related procedure, etc.), in accordance with various aspects and embodiments of the subject disclosure, are described further below, including with respect to FIG. 6 and its accompanying text. After determining its capabilities (e.g., determining the reduced group of physical layer operating capabilities), the UE can facilitate transmitting a second notification informing the network device of the reduced group of physical layer operating capabilities. Referring to FIG. 3 for example, in response to the inquiry signal, the UE can, at transaction (4) report its capability as a sub-set of its full capabilities (some of which are described below with reference to FIG. 6), wherein the UE capabilities are implementable by the UE. In this example embodiment, it can be a simple standardization effort, since the UE capabilities are part of the implementation anyway, and these example embodiments relates to the UE determining what to implement. Thus, in these example embodiments of FIG. 3, very little is left up to the network node as it complies with what the UE has requested as the updated capability. Everything can be left up to the UE to decide what the new capabilities should be.

While the examples described above in FIG. 3 relate only to the capabilities of the UE in implementing reduced physical layer procedures, wherein the simplifications relate to what the UE provides as its capabilities, in other example embodiments, as described below with respect to FIG. 4 and FIG. 5 below, the network node has more determination over which capabilities to apply that are related to the reduced physical layer procedures.

Figure 4:
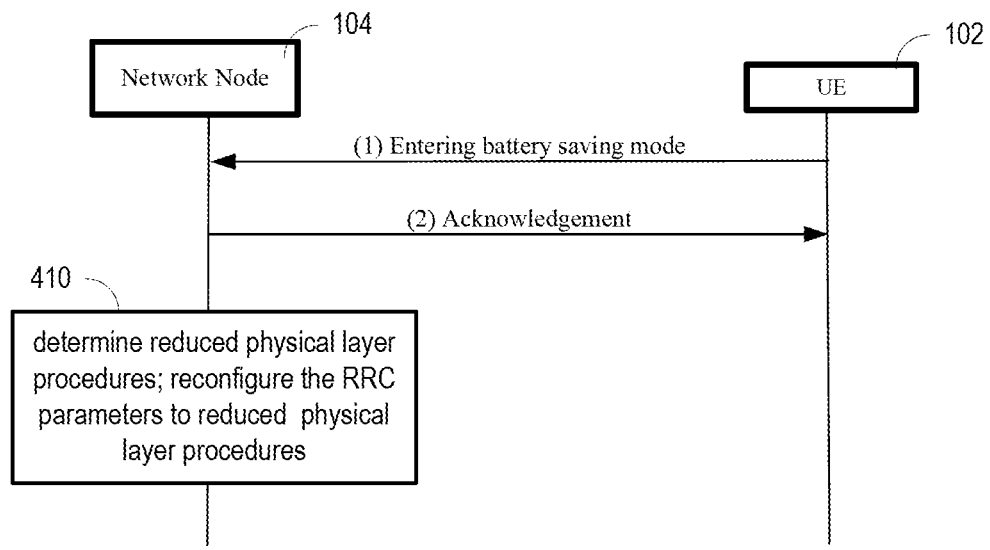
FIG. 4 illustrates a transaction diagram of another example wherein a network device can reconfigure parameters to facilitate the activation of the reduced physical layer communications procedures when the UE is in a battery saving mode of operation, in accordance with various aspects and embodiments of the subject disclosure.

Referring to FIG. 4, using separate RRC signaling, in example embodiments in accordance with various aspects and embodiments of the subject disclosure, the network node (e.g., network node 104) can determine the detailed configurations of the reduced physical layer procedures (where in some embodiments the configurability of various reduced physical layer procedures can be defined in the specification of a telecommunications standard (e.g., 5G standards). Referring to FIG. 4, at transaction (1) a UE can notify (or provide indication) that it is entering a battery saving mode (e.g., as a RRC signaling message to the network node). The network node can receive this notification that the UE (e.g., UE 102) is entering a battery saving mode of operation.

In response to receiving the notification, the can at transaction (2) respond by transmitting an acknowledgement to the UE indicating receipt of the notification that the UE is entering the battery saving mode of operation.

The network node can then at stage 410 determine reduced physical layer communications procedures comprising fewer procedures than physical layer communications procedures used when the UE is not in the battery saving mode of operation (e.g., by reconfiguring RRC parameters). The reduced physical layer communications procedures can comprise an uplink and downlink procedure applicable to first transmissions via a physical uplink channel (e.g., a physical uplink shared channel (PUSCH), a physical uplink control channel (PUCCH), etc.) from the user equipment to the network device and second transmissions via a physical downlink channel (e.g., a physical downlink shared channel (PDSCH), a physical downlink control channel (PDCCH), etc.) from the network node to the user equipment. The reduced physical layer communications procedures can comprise a channel state information feedback procedure (e.g., a CSI feedback procedure) for determination of first parameters related to a protocol for the first transmissions and the second transmissions. The reduced physical layer communications procedures can comprise a radio resource management procedure applicable to radio resource management measurements used to monitor signals that relate to a quality of the first transmissions and the second transmissions (e.g., an RRM related procedure). Example embodiments of reduced physical layer procedures (e.g., carrier aggregation related procedure, carrier dual connectivity related procedure, and higher layer related procedure, etc.), in accordance with various aspects and embodiments of the subject disclosure, are described further below, including with respect to FIG. 6 and its accompanying text.

Still referring to FIG. 4, after the network node determines the reduced physical layer communications procedures, the network node can reconfigure parameters to facilitate an activation of the reduced physical layer communications procedures by the network node and at the UE. For example, still at stage 410, the network node can reconfigure the RRC parameters to simplify some of the physical layer procedures (e.g. the RRC signaling may specify a reduced number of blind decoding the UE shall perform, or a smaller maximum transport block size and MIMO layers, etc., as described further below with respect to FIG. 6).

In the example embodiments of FIG. 4, even mandatory features can be reduced. Everything can be left up to the network node to decide what the new set of UE capabilities will be, even though the network node does not know of the implementation details known by the UE.

Figure 5:
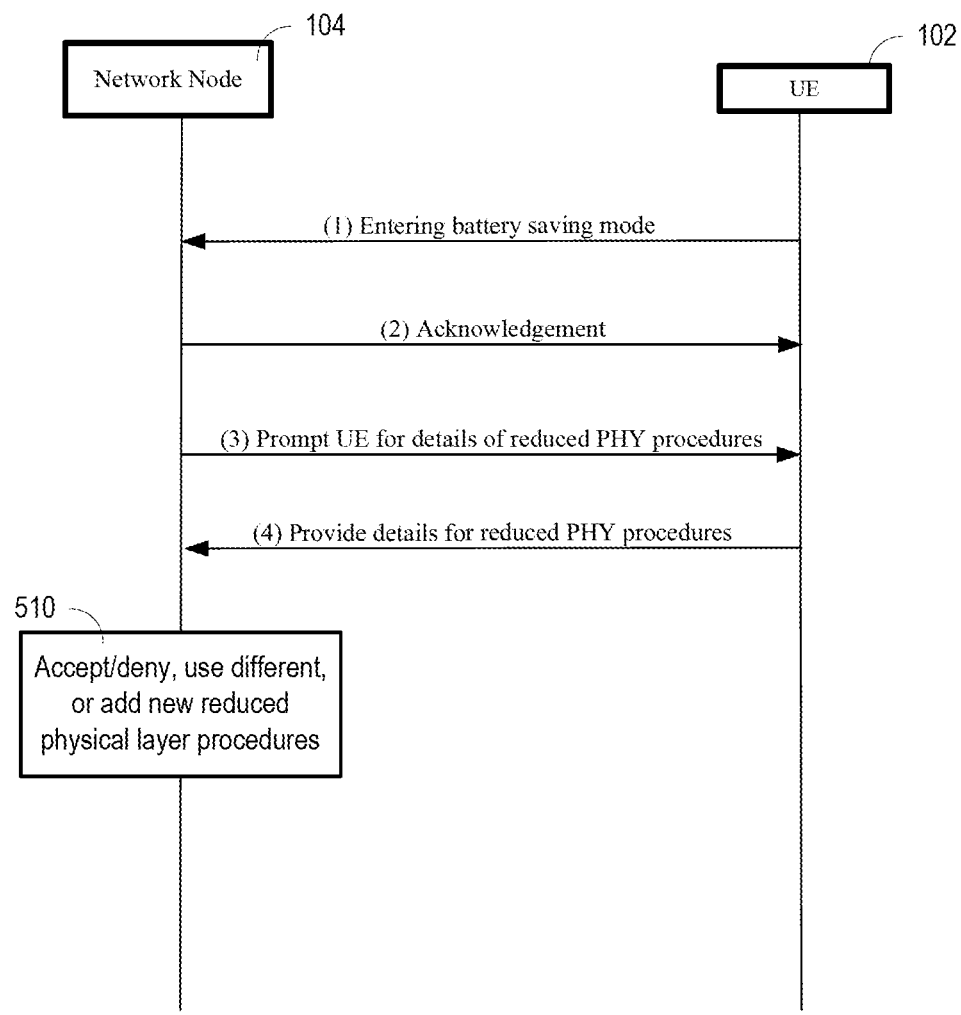
FIG. 5 illustrates a transaction diagram of another example wherein a UE provides recommendations for reduced physical layer communications procedures when the UE is in a battery saving mode of operation, in accordance with various aspects and embodiments of the subject disclosure.

FIG. 5 provides an illustration of other example embodiments in accordance with various aspects and embodiments of the subject disclosure, wherein the UE (e.g., UE 102) recommends the details of the configuration of reduced physical layer procedures. First, the UE can detect a drop in a level of charge of a battery of the user equipment below a threshold. In response to the drop in the level of charge below the threshold, the UE at transaction (1) can facilitate transmitting a notification (e.g., as an RRC signaling message) to a network node (e.g., network node 104) that the user equipment is entering a battery power preservation mode of operation that is to consume less battery power than a standard power mode of operation.

The network node can, transaction (2) facilitate the transmission of an acknowledgement to the UE indicating that the notification that the user equipment is entering a battery preservation mode has been received.

The network node can at transaction (3) send a signal prompting the UE to provide the details of the configuration of reduced physical layer procedures. In some example embodiments, the acknowledgement and the prompt signal can be the sent in the same transmission. In response to the prompt, the UE can facilitate transmitting to the network node device a signal comprising a recommendation of first physical layer communications procedures fewer in number than second physical layer procedures that are applicable to the standard power mode of operation. For example, the UE can at transaction (4) send to the network node configuration details corresponding to reduced physical layer procedures, which can be comprised in a list of reduced physical layer procedures and corresponding configuration details. The recommendation of first communications procedures can relate to transmissions via a physical uplink channel (e.g., a physical uplink shared channel (PUSCH), a physical uplink control channel (PUCCH), etc.) from the user equipment to the network node device and via a physical downlink channel (e.g., a physical downlink shared channel (PDSCH), a physical downlink control channel (PDCCH), etc.) from the network node device to the user equipment. The recommendation of first communications procedures can relate to analysis of channel state information feedback (e.g., a CSI feedback) to determine parameters related to a protocol for the transmissions. The recommendation of first communications procedures can relate to radio resource management measurements to monitor signals that relate to a quality of the transmissions (e.g., an RRM related procedure). Example embodiments of reduced physical layer procedures (e.g., carrier aggregation related procedure, carrier dual connectivity related procedure, and higher layer related procedure, etc.), in accordance with various aspects and embodiments of the subject disclosure, are described further below, including with respect to FIG. 6 and its accompanying text.

Still referring to FIG. 5, the network node, in response to the recommendations, can at stage 510 accept or deny the recommendations. The reduced physical layer procedures configured by the network node may be a different group, or an additional group, from the ones the UE requested. Thus, in these example embodiments, the UEs can make recommendations, but it is still up to the network node to determine which recommendations to apply. Thus, in these example embodiments of FIG. 5, the UE can make recommendations to simplify the procedures consuming the most power (different UE vendors may have different power consumption profiles on each physical layer procedure), and in response, the network node can accept/deny, or use different configurations, or even add new reduced procedure depending on the networks overall situation.

Figure 6:
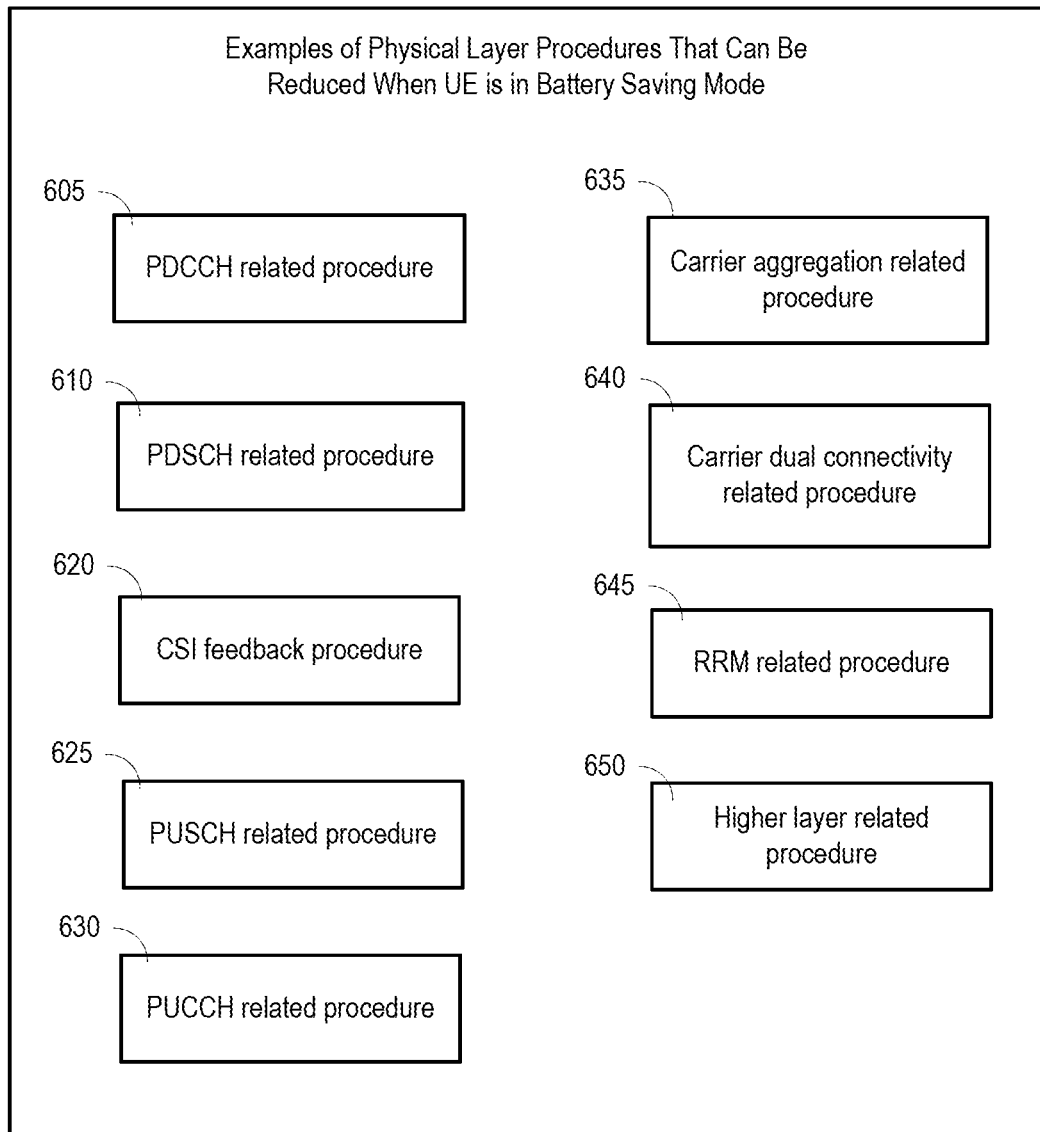
FIG. 6 illustrates examples of reduced physical layer communications procedures that can be implemented when a UE is in battery saving mode, in accordance with various aspects and embodiments of the subject disclosure.

FIG. 6 provides a list of examples of reduced physical layer procedures (e.g., that can be implemented with respect to the example embodiments of FIGS. 4 and 5). To the extent mentioned, each example might involve a UE (e.g., UE 102) and a network node (e.g., network node 104).

The example embodiments can comprise a reduced physical downlink control channel (PDCCH) procedure 605. In example embodiment networks (e.g., network 106), the PDCCH carries the resource assignment for UEs (e.g., UE $104_{1-n}$) which are contained in a Downlink Control Information (DCI) message. Multiple PDCCHs can be transmitted in the same subframe using Control Channel Elements (CCE), each of which is a nine set of four resource elements known as Resource Element Groups (REG). The decoding of DCI in LTE is based upon a process that is defined as a blind decoding, which depends on a number of decoding attempts on a number of PDCCH candidate locations for a number of defined DCI formats. Typically, the UE checks all possible combinations of PDCCH locations, PDCCH formats, and DCI formats, and acts on those messages with correct cyclic redundancy checks (CRCs). Carrying out such a "blind decoding" of all the possible combinations would require the UE to make many PDCCH decoding attempts in every subframe. The reduced PDCCH physical layer procedure can relate to a reduction in a number of blind decoding operations performed by the UE in the battery saving mode, thereby reducing the amount of remaining battery charge that would otherwise be further drained as part of attempts to processes all blind decoding. Also, related to the PDCCH, a group common PDCCH can carry the current uplink-downlink configuration (which can be an indicator that is transmitted periodically). In example embodiments, the UE can begin to decode the group common PDCCH so as to reduce the number of blind decoding procedures.

In example embodiments, the reduced physical downlink control channel (PDCCH) procedure 605 can also comprise a reduction in the number of control channel resource sets. For the PDCCH, the network side typically configures K control channel resource sets for each UE (e.g., UE 102), where K is a positive integer greater than or equal to 1, and each control channel resource set includes at least one physical resource block pair (PRB pair). As an example, the network side can configure three control channel resource sets for the UE, and each control channel resource set includes four PRBs (physical resource block, physical resource block) pairs. In example embodiments, while in battery saving mode, the UE can reduce the number of control channel resource sets used (for example, instead of 3, use 2).

Referring to FIG. 6, the example embodiments can comprise a reduced physical downlink shared channel (PDSCH) related procedure 610. In example embodiment networks (e.g., network 106), the PDSCH is the main data bearing channel that carries UE data (e.g., data that corresponds to, for example, video, email, documents, etc.), which is allocated to users on a dynamic and opportunistic basis (often referred to as "best effort"). The PDSCH carries data in Transport Blocks (TB) that correspond to a machine layer data protocol unit (MAC PDU) and are passed from the MAC layer to the PHY layer once per Transmission Time Interval (TTI), which can comprise 1 millisecond. Thus, the transport block size can relate to an amount of data determined to be transmitted in a time frame.

The reduced PDSCH related procedure 610 can involve a reduction of the transport block size for the transmissions on the physical downlink channel. The size of the transport block can be chosen using several parameters, which are derived from several other parameters. Typically, some of the parameters that are considered for determining the transport block size are the amount of data available from the user, the modulation scheme possible based on the channel quality indicator (CQI) reported by the UE (e.g., UE 102), and the number of resource blocks available in the physical resource grid. In example embodiments in accordance with the present in accordance with various aspects and embodiments of the subject disclosure, the transport block size is also determined by whether the UE is in a battery saving mode. In addition to reducing the size, the bandwidth (wherein the bandwidth is representative of a rate at which data is transmitted between the UE and the network node) for PDSCH resource allocation can also be reduced, thereby reducing the amount of data that can be transmitted during a certain period (e.g., slowing the rate of transmission). Thus, in the reduced PDSCH relate procedure 610, if the UE has entered a battery saving mode, the size of the TB can be reduced. A reduction in an amount of bandwidth allocated to the user equipment from the network device (e.g., reducing the bandwidth for PDSCH resource allocation) can also be implemented.

The reduced PDSCH related procedure 610 can also involve a modification in error processing. To guard against propagation channel errors, leading to loss of this transmitted data, the PDSCH procedure comprises the use of forward error correction (FEC) and error control, so that any lost packets of data can be re-transmitted. One such technique is the hybrid automatic repeat request (hybrid ARQ or HARQ), a combination of high-rate FEC coding and ARQ. If the transmission contains an error, a retransmission request is sent back to the UE (e.g., UE 102) to resend the transmission. In synchronous uplink systems, there are standards for scheduling so that a certain amount of time is allotted to send the retransmission requirement. To meet the requirement of synchronous uplink retransmission, the network node (e.g., network node 104) typically attempts to complete the processing of uplink channel data within a 3 ms time period so that if a retransmission needs to be sent, the network node can alert the UE to resend the transmission by the eighth transmission time interval (or 8 ms after the first transmission was sent). If this time requirement is not met, the mobile device cannot resend the data until the sixteenth transmission time interval, or 16 ms after the first transmission is sent, which can slow down the uplink throughput bandwidth. In example embodiments, the reduced PDSCH related procedure 610, in operation when the UE is in battery save mode, can comprise, in an error checking protocol, an increase of the amount of time that a network node device waits before sending a request for retransmission of data. This can be, for example, an enlargement in the HARQ processing time (e.g., enlarge the amount of time for the processing of uplink channel data beyond 3 ms).

Still referring to FIG. 6, in example embodiments, the reduced PDSCH related procedure 610 can comprise a reduction in the number of MIMO transmission layers, or a reduction in the number of antennas used. Multi-antenna techniques, using multiple transmit and receive antennas, have been implemented for current systems and are likely to play a large role in upcoming 5G networks. The use of multiple input multiple output (MIMO) techniques can improve the spectral efficiency of transmissions, thereby significantly boosting the overall data carrying capacity of wireless systems. The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). In example embodiments, the reduced physical downlink shared channel (PDSCH) related procedure 610 can have more than one antenna on the transmit and receive side, but use a configuration that involves different schemes, wherein less than all antennas are used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, for example, multiple transmitters can be used on the transmit side, but only one antenna on the receive side (e.g., multiple input single output MISO). Additionally, in multiple antenna techniques, data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, or, put in another way, the number of different transmission layers transmitted in parallel. As an example, a multiple antenna transmitter can transmit in parallel on all four antennas the same content or information to the user equipment. The reduced PDSCH related procedure 610 can be a reduction in a number of transmission layers used in a multiple input multiple output antenna transmission protocol (e.g., the number of transmission layers can be reduced; for example, instead of transmitting 4 streams of data having the same content, only transmit 2). As another example, in the reduced PDSCH related procedure 610, even when diverse streams are being transmitted, the number of antennas engaged it the transmission of the diverse streams can be reduced. With the battery save mode is activated (or in other words, in operation), multi-antenna schemes that would otherwise be selected for a particular transmission would not be used in favor of a scheme involves less battery consumption by the UE (e.g., UE 102). Thus, the reduced PDSCH related procedure 610, which can be activated when the UE has entered battery saving mode, can comprise the use of antenna schemes that reduce the number of antennas being used and also reduce the number of transmissions, which can reduce power consumption when the battery is already low on charge.

Still referring to FIG. 6, the example embodiments of reduced physical layer procedures can comprise a reduced channel state information (CSI) feedback procedure 620. In some embodiments of a mobile network (e.g., network 106), including LTE, a technique involves closed loop spatial multiplexing that uses codebook-based precoding (wherein open loop systems do not require knowledge of the channel at the transmitter, while closed loop systems require channel knowledge at the transmitter, provided by a feedback channel by a UE). In this technique, a reference signal (also referred to as a pilot signal, or pilot) is first sent from the network node (e.g., network node 104) to the UE (e.g., UE 102). Downlink reference signals are predefined signals occupying specific resource elements within the downlink time-frequency grid. The reference signal (RS) can be beam formed or non-beam formed to a user equipment. The reference signal can be cell specific or UE specific in relation to a profile of the user equipment 102 or some type of mobile identifier. There are several types of downlink reference signals that are transmitted in different ways and used for different purposes by the receiving terminal. Channel state information reference signals (CSI-RS) are specifically intended to be used by terminals to acquire channel state information (CSI) and beam specific information (beam RSRP). In 5G, CSI-RS is UE specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal. Other than these reference signals (CSI-RS, DM-RS), there are other reference signals, namely phase tracking reference signals, multicast-broadcast single-frequency network (MBSFN) signals, and positioning reference signals used in various purposes. From the reference signals, the UE can compute the channel estimates and the parameters needed for channel state information (CSI) reporting. In LTE, the CSI report comprises, for example, precoding matrix index (PMI), the channel quality indicator (CQI), rank information (RI), etc. The indicator of channel state information (e.g., PMI in LTE) can be used for selection of transmission parameters for the different data streams transmitted between the network node and the UE. In techniques using codebook-based precoding, the network node and UE uses different codebooks, which can be found in standards specifications, each of which relate to different types of MIMO matrices (for example, a codebook of precoding matrices for 2×2 MIMO). The codebook is known (contained) at the node and at the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE transmits feedback that comprises recommendations for a suitable precoding matrix out of the appropriate codebook (e.g., points the index of the precoder in one of the codebook entries). This UE feedback identifying the precoding matrix is called the pre-coding matrix indicator (PMI). The UE is thus evaluating which pre-coding matrix would be more suitable for the transmissions between the network node and UE. Additionally, the CSI feedback also can comprise an indicator of channel quality (e.g., in LTE the channel quality indicator (CQI)), which indicates the channel quality of the channel between the network node and the user equipment for link adaptation on the network side. Depending which value a UE reports, the node transmits data with different transport block sizes. If the node receives a high CQI value from the UE, then it transmits data with larger transport block size, and vice versa. Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2." The CSI report is sent to the network node via a feedback channel either on a periodic basis or on demand based CSI (e.g., aperiodic CSI reporting). The network node scheduler uses this information in choosing the parameters for scheduling of this particular UE. The network node sends the scheduling parameters to the UE on the downlink control channel called the physical downlink control channel (PDCCH). After that, actual data transfer takes place from the network node to the UE (e.g., on the PDSCH).

Still referring to FIG. 6, the reduced CSI feedback procedure 620 can involve changes to the CSI feedback protocol. For example, while in battery saving mode, CSI reference signals can continue to be sent, but the number of CSI reference signals can be reduced, for example, by not transmitting any aperiodic CSI reference signals, and correspondingly, by not providing an aperiodic CSI report. This can result in a reduced CSI feedback procedure 620 that comprises a reduction in the number of CSI-RS sent to the UE by the network node. A codebook subset restriction can also be applied to reduce codebook search effort, since more searching can lead to more battery consumption. Note the CSI feedback report relates to the selection of antenna transmission techniques, which was discussed above. The reduced CSI feedback 620 can also reduce the number of CSI processes, for example, having the UE measure a CSI-RS reference signal from a single transmission device, and wherein the channel state information reference signal is received from the network node (e.g., by having the UE only measure the CSI-RS from one transmission receive point (TRP), instead of multiple TRPs). The number of CSI-RS configurations can also be reduced.

Still referring to FIG. 6, the reduced physical layer procedure can comprise a reduced physical uplink shared channel (PUSCH) related procedure 625. In some embodiments of a mobile network (e.g., network 106), a PUSCH carries user data. Similar to the downlink (e.g., PDSCH), the uplink scheduling interval is 1 ms. The PUSCH carries, in addition to user data, control information that may be necessary to decode the information, including transport format indicators and MIMO parameters. In example embodiments, during a battery power saving mode, the PUSCH procedure can be reduced in similar ways to the simplifications for the PDSCH described above. These can comprise, for example: reducing the transmit power; reducing the bandwidth for PUSCH resource allocation; reducing the MIMO layers for PUSCH; reducing the transport block (TB) size for PUSCH; and enlarging the timing gap between a PUSCH grant and PUSCH transmission (this can give the UE more time to encode and process, in between grant and transmission, which can reduce the power usage of the UE).

Still referring to FIG. 6, the reduced physical layer procedure can comprise a reduced physical uplink control channel (PUCCH) related procedure 630. In example embodiments of a mobile network (e.g., network 106), the PUCCH control signaling comprises uplink data transmitted independently of traffic data, which can include HARQ ACK/NACK, channel quality indicators (CQI), MIMO feedback (Rank Indicator, RI; Precoding Matrix Indicator, PMI) and scheduling requests for uplink transmission. It comprises one resource block (RB) per transmission at one end of the system bandwidth, followed by an RB in the following slot at the opposite end of the channel spectrum, thus making use of frequency diversity with an estimated gain of 2 dB. A PUCCH control region comprises every two such RBs. As with other uplink and downlink channels, a reduced PUCCH procedure 630 can comprise a reduction of the transmit power of the antenna of the UE. Additionally, in PUCCH, a self-contained subframe enables a transmission and ACK/NACK in the same subframe. While allow for the transmission of information, in the reduced PUCCH procedure 630, self-contained subframe functionality does not need to be performed while the UE is in battery saving mode.

Still referring to FIG. 6, the reduced physical layer procedure can comprise a reduced carrier aggregation related procedure 635. In some example embodiments of a mobile network (e.g., network 106), carrier aggregation (CA) relates to using two or more component carriers (CCs) being aggregated in order to support wider transmission bandwidths. A UE (e.g. UE 102) may simultaneously receive or transmit on one or multiple CCs depending on its capabilities. In a reduced carrier aggregation related procedure 635, the number of CCs that are aggregated can be reduced when the UE is in battery saving mode. Also related to a reduced carrier aggregation related procedure 635, carrier aggregation can involve intra-band aggregation, in which CCs can be aggregated within a band, or inter-band aggregation, in which CCs are aggregated in one band, and also in at least another. Here, the reduced procedure may still involve carrier aggregation, but may be limited to intra-band aggregation only while the UE is in battery saving mode.

Still referring to FIG. 6, the reduced physical layer procedure can comprise a reduced dual-connectivity related procedure 640. With respect to dual connectivity, in example embodiments of a mobile network (e.g., network 106), downlink and uplink physical layer parameter values can be set by the ue-CategoryDL and ue-CategoryUL fields, respectively. As an example, for the UE DL Category 1, the downlink data rate might be 10 Mbps, and the maximum number of layers might be 1. For UE DL Category 6, the downlink data rate might be 3000 Mbps, while the maximum number of data layers might be 8. For the uplink, for UE UL Category 1, the uplink data rate might be 5 Mbps, while the maximum number of data layers might be 1. For UE UL category 8, the uplink data rate might be 1500 Mbps, while the maximum number of data layers might be 4. In example embodiments, a reduced dual-connectivity related procedure 640, which can be activated when the UE is in battery saving mode, can comprise lower UE DL and UL categories, and thus reduced data rate and reduction in the number of layers, leading to less drain on the UE's battery.

Still referring to FIG. 6, the reduced physical layer procedure can comprise a reduced radio resource management (RRM) related procedure 645. In example embodiments of some mobile networks (e.g., network 106), one aspect relate to RRM relates to cellular handover when a UE (e.g., UE 102) moves from cell to cell. When a UE has connectivity with its network core (e.g., LTE core network) and maintains that connectivity when it moves within network coverage (e.g., from one cell to another), this can be referred to as intra-LTE mobility. Intra-LTE mobility can be comprised of two variants, which are intra-frequency mobility (also referred to as intra-RAT) and inter-frequency mobility (also referred to as inter-RAT). With intra-frequency mobility, the UE performs a handover from one network node (e.g., the source network node) to another network node operating on the same frequency used with the source network node. With inter-frequency mobility, the UE performs a handover from one network node (e.g., the source network node) to another network node operating on a frequency that is difference from the source network node. In a normal state of operations, a UE typically monitors for frequencies for intra-/inter-RAT mobility. In example embodiments, a reduced RRM related procedure 645, which can be activated when the UE is in battery saving mode, can comprise a reduction of a number of frequencies that the user equipment monitors for transitions from a first cellular coverage area (e.g., sector) of a first mobile network cellular site to a second cellular coverage area of a second mobile network cellular site (e.g., a reduction by the UE of the number of frequencies that the UE is monitoring for intra-/inter-RAT mobility, which can reduce the energy drain on the battery of the UE because it consumes energy to monitor for more frequencies).

Additionally, in RRM, several parameters are typically monitored, including reference signal received power (RSRP), Received Signal Strength Indicator (RSSI), Reference Signal Received Quality (RSRQ), Signal to Interference and Noise Ratio (SINR). The parameters are measured periodically, and cells are reported on per interval. In example embodiments, a reduced RRM related procedure 645, which can be activated when a UE is in battery saving mode, can comprise relaxing RRM measurement requirements. This can be, for example, a reduction in the quantity of radio resource measurements by the UE within a period. For example, the inter-measurement interval (e.g., time between measurements) can be increased so that a UE low on battery charge need not make measurements as frequently. As another example, the number of cells to report per interval can also be decreased.

Still referring to FIG. 6, the reduced physical layer procedure can comprise can comprise a reduced higher layer related procedure 650. In some embodiments of a mobile network (e.g., mobile network 106), bearer channels can be assigned to UEs that are connected to the network. In short, a bearer is a set of network parameters that defines how the data carried on that channel is to be treated. Typically, when a UE connects to a network node (e.g., network node 104), it is assigned a default bearer for best effort service (e.g., non-guaranteed bit rate) for the data that flows on the default bearer. Dedicated bearers (which provide a dedicated tunnel for one or more specific types of traffic). More than one bearer can be established. In example embodiments, a reduced higher level related procedure 650, which can be activated when a UE is in battery saving mode, can comprise reducing the number of bearers. Each bearer can consume energy from the battery of the UE, so reducing the number of bearers can reduce the drain on the UE's battery.

Another reduced higher layer procedure 650 relates network services such as enhanced mobile broadband (eMBB), ultra-reliable and low latency communications (uRLLC), both of which are expected to be offered as part of a 5G network. EMBB focuses on services that have high requirements for bandwidth, such as high definition (HD) videos, virtual reality (VR), and augmented reality (AR). URLLC focuses on latency-sensitive services, such as assisted and automated driving, and remote management. A reduced higher layer related procedure 650, which can be activated when a UE is in battery saving mode, can reduce the number of communication channels used for transmissions. For example, the procedure can be a reduction in the number of bearers related to EMBB, or uRLLC services, or both. The higher level services can consume heavy amounts of energy at the physical layer, and as such, a UE in battery saving mode can conserve battery charge by focusing on one or the other, or neither.

Figure 7:
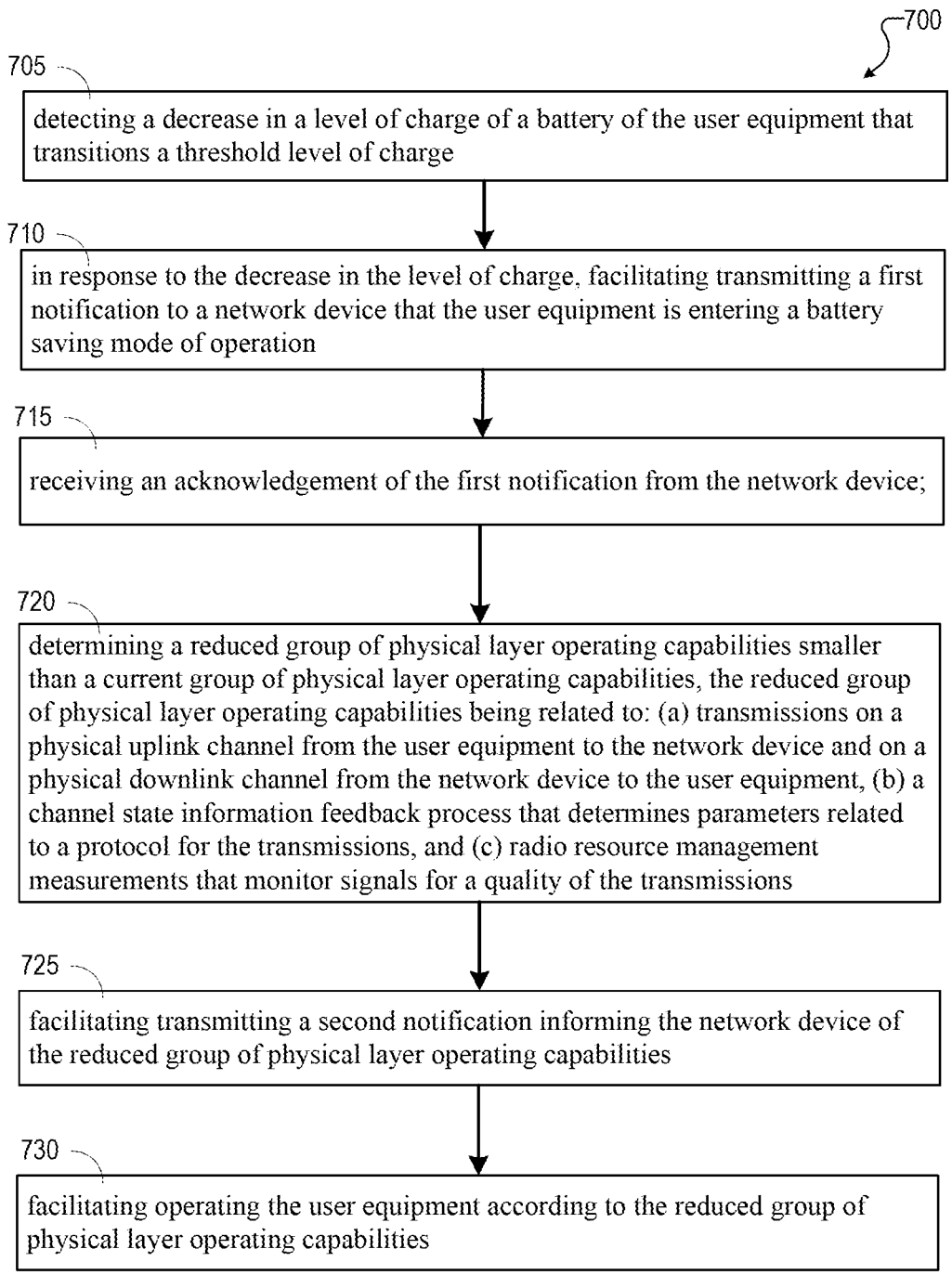
FIGS. 7-9 show example flow charts describing operations that can be performed, in accordance with various aspects and embodiments of the subject disclosure.
Figure 8:
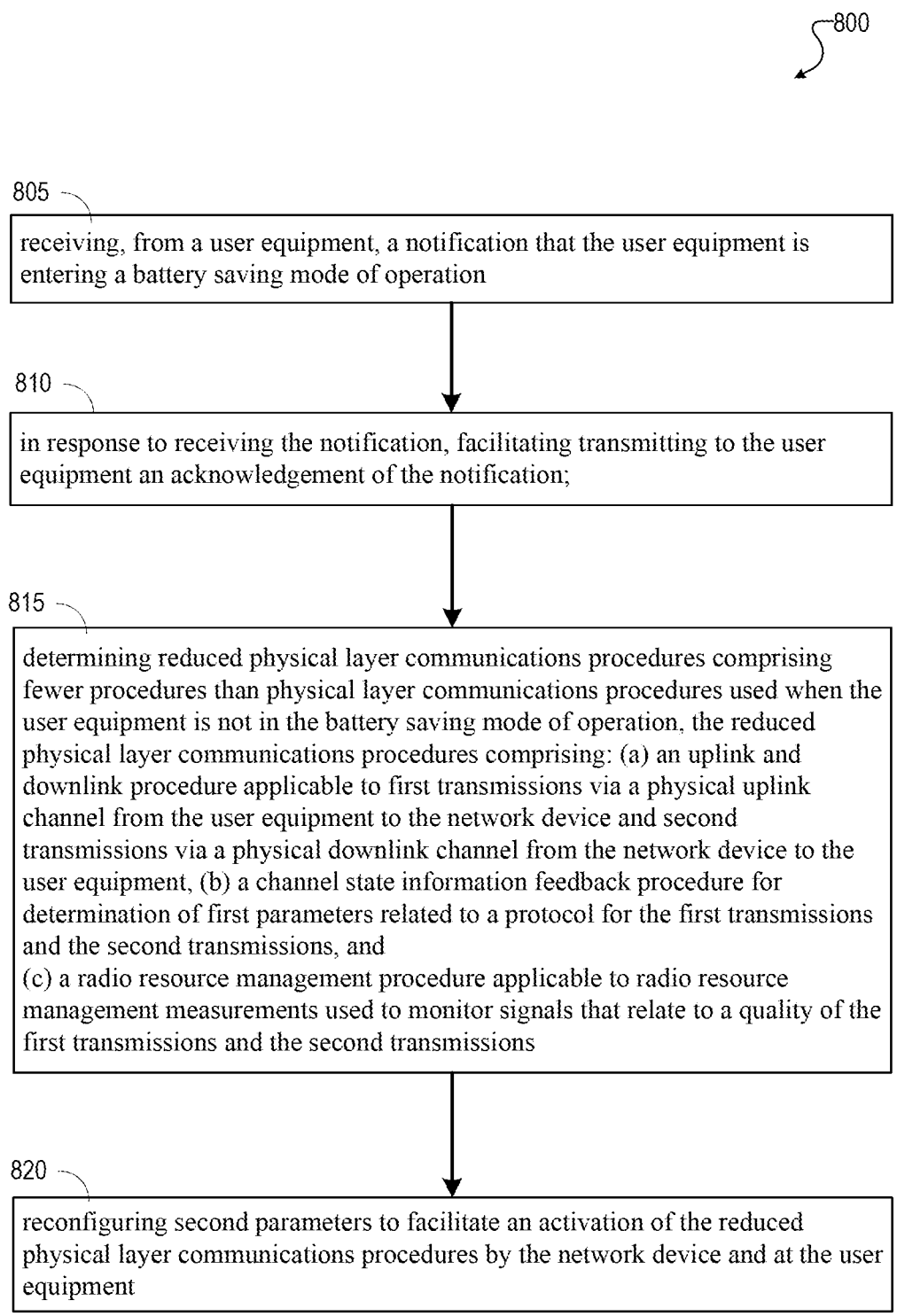
Figure 9:
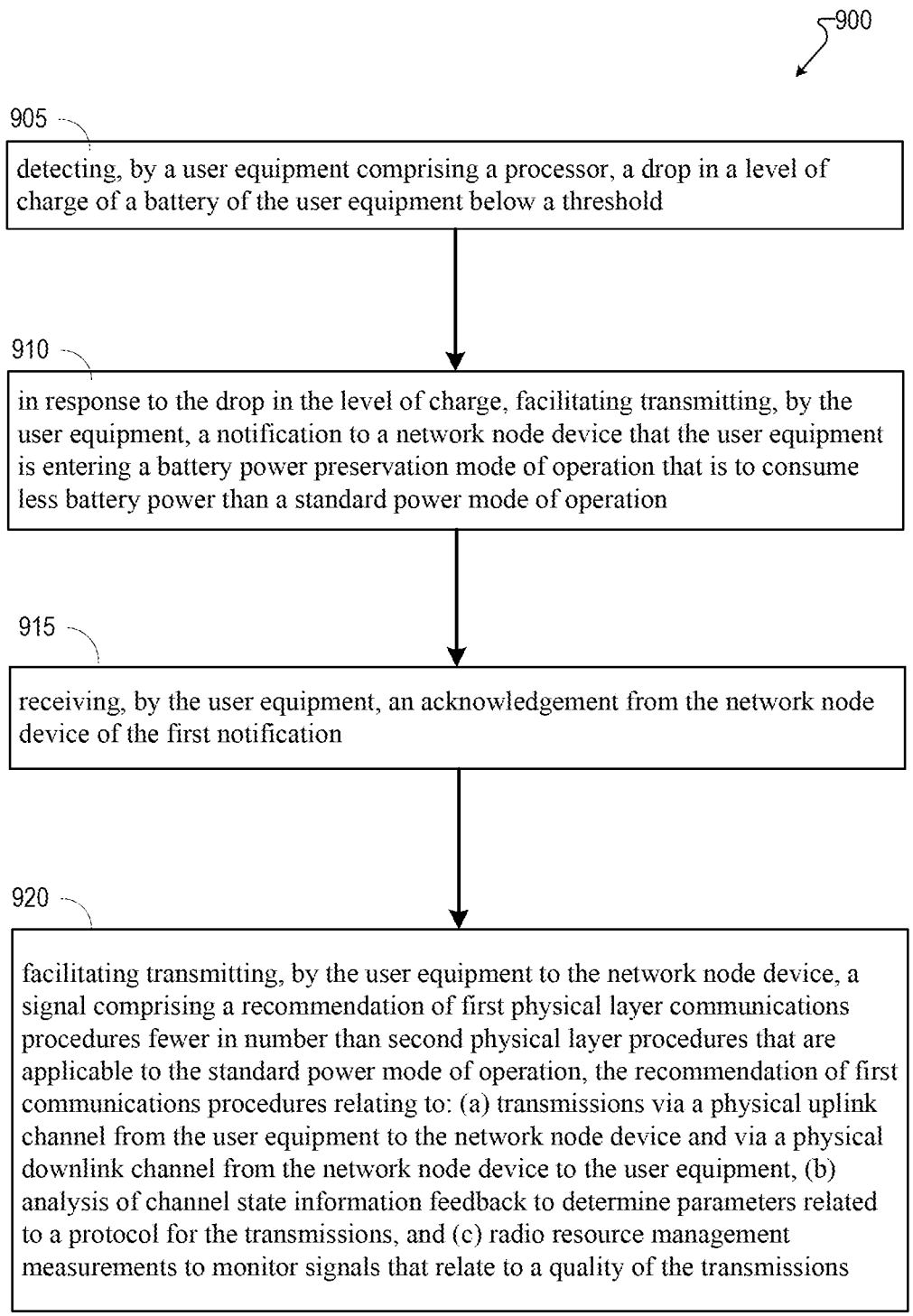

In accordance with some example embodiments, a computing devices (e.g., user equipment 102, network node 104) can be operable to perform example methods and operations, as illustrated in flow diagrams as shown in FIGS. 7-9 and described in the corresponding text, in accordance with various aspects and embodiments of the subject disclosure. Additionally, machine-readable storage medium, comprising executable instructions that, when executed by a processor, can also facilitate performance of the methods and operations described in FIGS. 7-9.

In non-limiting embodiments (also referred to as example embodiments), a user equipment (e.g., UE 102), comprising a processor and a memory that stores executable instructions that, when executed by the processor, facilitate performance of example operations 700, as shown in FIG. 7.

The operations can comprise, at step 705, detecting a decrease in a level of charge of a battery of the user equipment that transitions a threshold level of charge.

At step 710, the operations can further comprise facilitating transmitting a first notification to a network device that the user equipment is entering a battery saving mode of operation in response to the decrease in the level of charge.

At step 715, the operations can further comprise receiving an acknowledgement of the first notification from the network device.

The operations can further comprise, at step 720, determining a reduced group of physical layer operating capabilities smaller than a current group of physical layer operating capabilities (e.g., the current group being associated with physical layer procedures when the UE is not in battery saving mode). The reduced group of physical layer operating capabilities can be related to transmissions on a physical uplink channel (e.g., a physical uplink shared channel (PUSCH), a physical uplink control channel (PUCCH), etc.) from the user equipment to the network device. The reduced group of physical layer operating capabilities can be related to a physical downlink channel (e.g., a physical downlink shared channel (PDSCH), a physical downlink control channel (PDCCH), etc.) from the network device to the user equipment. The reduced group of physical layer operating capabilities can be related to a channel state information feedback process (e.g., a CSI feedback procedure) that determines parameters related to a protocol for the transmissions. The reduced group of physical layer operating capabilities can also be related to radio resource management measurements that monitor signals for a quality of the transmissions (e.g., an RRM related procedure). Example embodiments of reduced physical layer procedures (e.g., carrier aggregation related procedure, carrier dual connectivity related procedure, and higher layer related procedure, etc.), in accordance with various aspects and embodiments of the subject disclosure, are described further below, including with respect to FIG. 6 above and its accompanying text.

At step 725, the operations can further comprise facilitating transmitting a second notification informing the network device of the reduced group of physical layer operating capabilities.

The operations 700 can end at step 730, wherein the operations can further comprise facilitating operating the user equipment according to the reduced group of physical layer operating capabilities.

In non-limiting embodiments (also referred to as example embodiments), a network device (e.g., network node 104), comprising a processor and a memory that stores executable instructions that, when executed by the processor, facilitate performance of example operations 800, as shown in FIG. 8. The operations can comprise, at step 805, receiving, from a UE (e.g., UE 102), a notification that the UE is entering a battery saving mode of operation.

The operations 800 at step 810 can comprise, in response to receiving the notification, facilitating transmitting to the user equipment an acknowledgement of the notification.

In response to receiving the notification, the operations 800 at step 815 can comprise determining reduced physical layer communications procedures comprising fewer procedures than physical layer communications procedures used when the equipment is not in the battery saving mode of operation. The reduced physical layer communications procedures can comprise an uplink and downlink procedure applicable to first transmissions via a physical uplink channel (e.g., a physical uplink shared channel (PUSCH), a physical uplink control channel (PUCCH), etc.) from the user equipment to the network device and second transmissions via a physical downlink channel (e.g., a physical downlink shared channel (PDSCH), a physical downlink control channel (PDCCH), etc.) from the network device to the user equipment. The reduced physical layer communications procedures can comprise a channel state information feedback procedure (e.g., a CSI feedback procedure) for determination of first parameters related to a protocol for the first transmissions and the second transmissions. The reduced physical layer communications procedures can comprise a radio resource management procedure applicable to radio resource management measurements used to monitor signals that relate to a quality of the first transmissions and the second transmissions (e.g., an RRM related procedure). Example embodiments of reduced physical layer procedures (e.g., carrier aggregation related procedure, carrier dual connectivity related procedure, and higher layer related procedure, etc.), in accordance with various aspects and embodiments of the subject disclosure, are described further below, including with respect to FIG. 6 and its accompanying text.

The operations 800 can end at step 820, wherein the operations further comprise reconfiguring second parameters to facilitate an activation of the reduced physical layer communications procedures by the network device and at the UE.

In non-limiting embodiments, as shown in FIG. 9, a method 900 can be performed by a user equipment (e.g., UE 102). The method 900 can begin at step 905, wherein the method can comprise detecting, by the UE, a drop in a level of charge of a battery of the user equipment below a threshold.

The method 900 can further comprise at step 910, in response to the drop in the level of charge, facilitating transmitting, by the UE, a notification to a network node device (e.g., network node 104) that the user equipment is entering a battery power preservation mode of operation that is to consume less battery power than a standard power mode of operation.

At step 915, the method can further comprise receiving, by the user equipment, an acknowledgement from the network node device of the first notification.

The method 900 can further comprise, at 920, facilitating transmitting, by the user equipment to the network node device, a signal comprising a recommendation of first physical layer communications procedures fewer in number than second physical layer procedures that are applicable to the standard power mode of operation. The recommendation of first communications procedures can relate to transmissions via a physical uplink channel (e.g., a physical uplink shared channel (PUSCH), a physical uplink control channel (PUCCH), etc.) from the user equipment to the network node device and via a physical downlink channel (e.g., a physical downlink shared channel (PDSCH), a physical downlink control channel (PDCCH), etc.) from the network node device to the user equipment. The recommendation of first communications procedures can relate to analysis of channel state information feedback (e.g., a CSI feedback) to determine parameters related to a protocol for the transmissions. The recommendation of first communications procedures can relate to radio resource management measurements to monitor signals that relate to a quality of the transmissions (e.g., an RRM related procedure). Example embodiments of reduced physical layer procedures (e.g., carrier aggregation related procedure, carrier dual connectivity related procedure, and higher layer related procedure, etc.), in accordance with various aspects and embodiments of the subject disclosure, are described further below, including with respect to FIG. 6 and its accompanying text.

Figure 10:
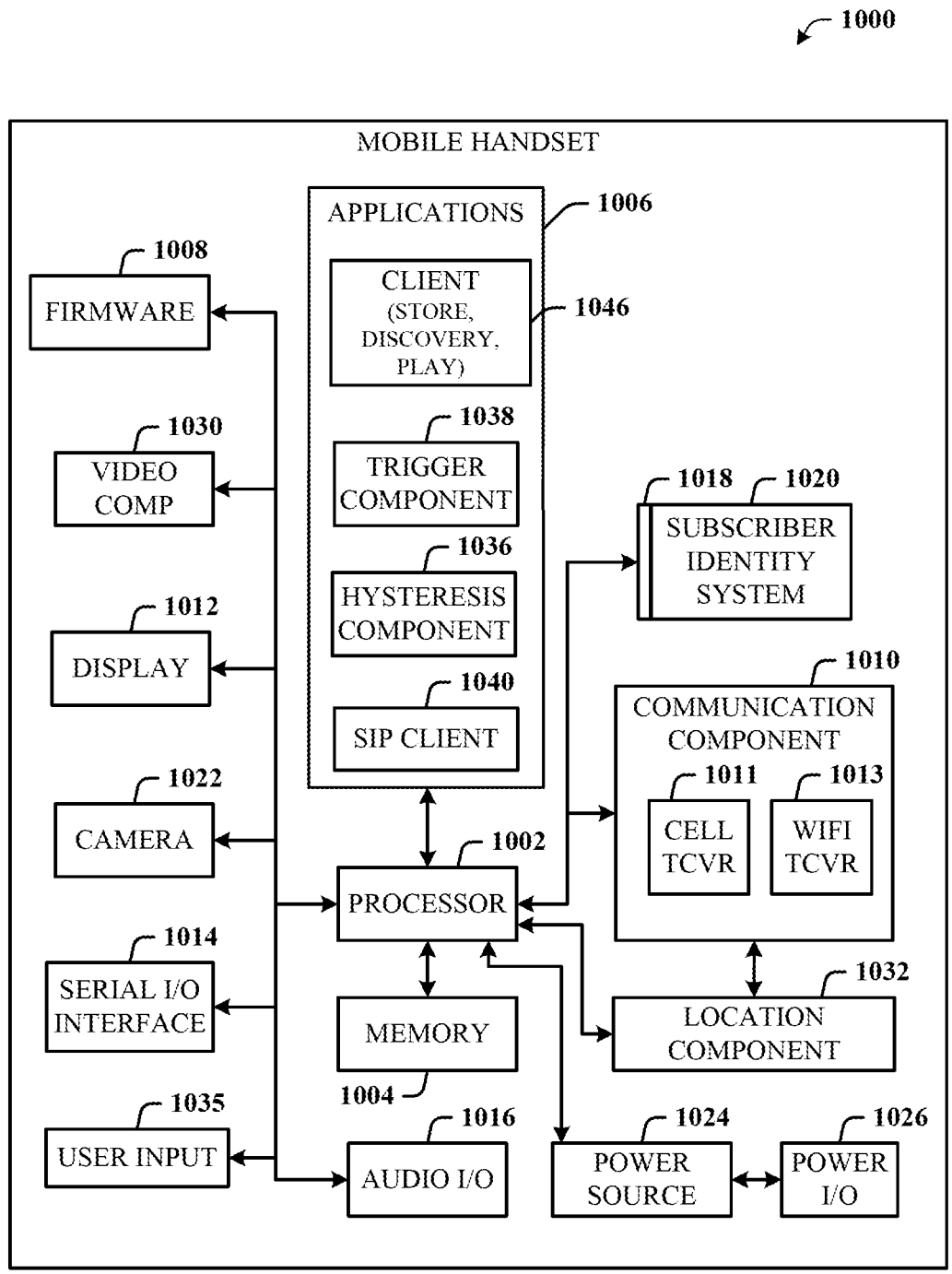
FIG. 10 illustrates an example block diagram of an example mobile handset, which can be a UE, in accordance with various aspects and embodiments of the subject disclosure.

Referring now to FIG. 10, illustrated is a schematic block diagram of a user equipment (e.g., UE 102, etc.) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a global GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A session enable protocol (SIP) client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the handset 1000. The handset 1000 can accommodate at least satellite radio services through a handset that can combine wireless voice and digital radio chipsets into a single handheld device.

Referring now to FIG. 17, there is illustrated a block diagram of a computer 1700 operable to execute the functions and operations performed in the described example embodiments. For example, a network node (e.g., network node 104) may contain components as described in FIG. 17. The computer 1700 can provide networking and communication capabilities between a wired or wireless communication network and a server and/or communication device. In order to provide additional context for various aspects thereof, FIG. 17 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 11:
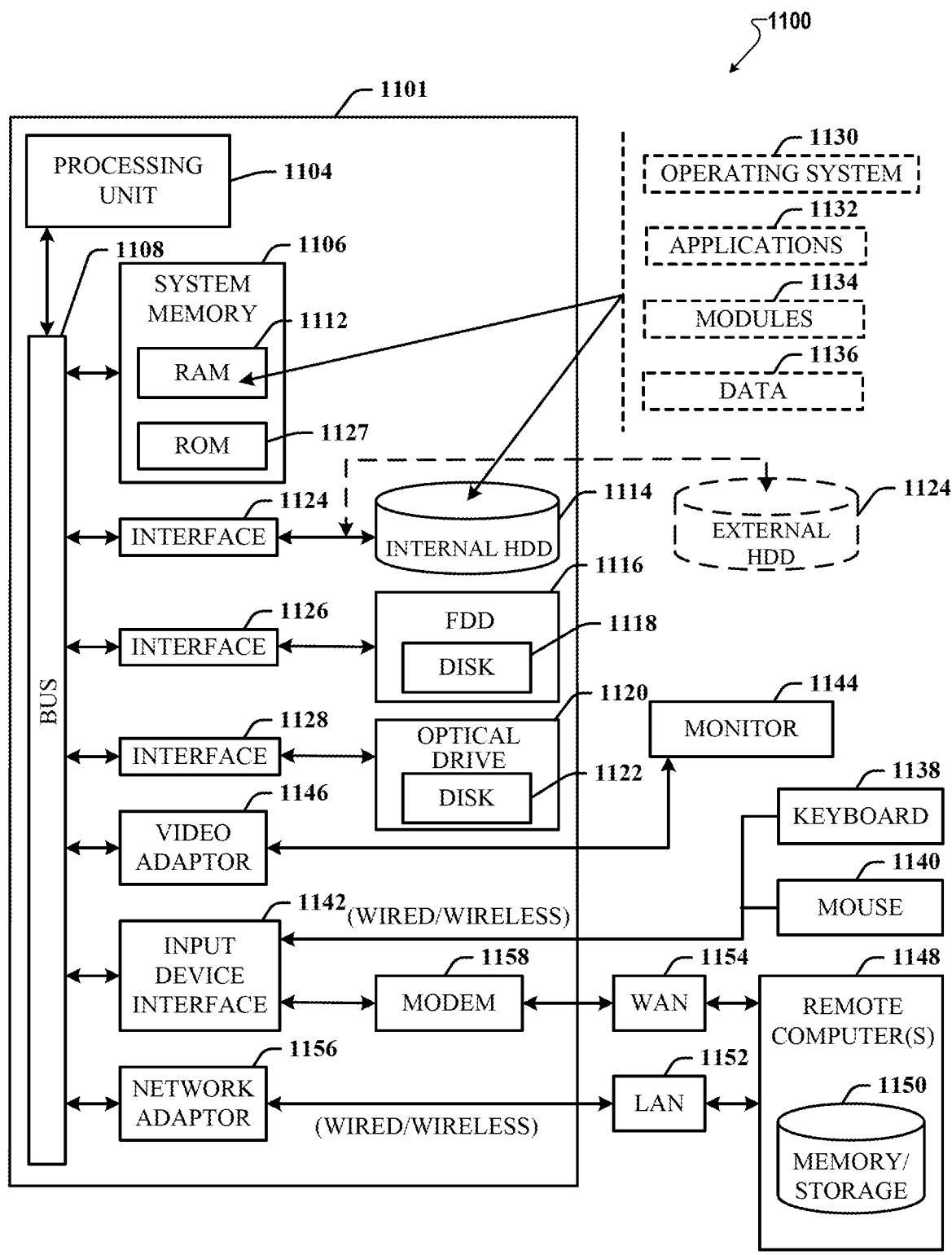
FIG. 11 illustrates an example block diagram of a computer, which can be a network node, that can be operable to execute processes and methods, in accordance with various aspects and embodiments of the subject disclosure.

With reference to FIG. 11, implementing various aspects described herein with regards to devices (e.g., network node 104) can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 2394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1100 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment, comprising:
a processor; and
a memory that stores executable instructions that, when executed by the processor, facilitate performance of operations, comprising:
detecting a decrease in a level of charge of a battery of the user equipment that transitions a threshold level of charge;
in response to the decrease in the level of charge, facilitating transmitting a first notification to a network device that the user equipment is entering a battery saving mode of operation;
receiving an acknowledgement of the first notification from the network device;
determining a reduced group of physical layer operating capabilities smaller than a current group of physical layer operating capabilities, the reduced group of physical layer operating capabilities being related to:
transmissions on a physical uplink channel from the user equipment to the network device and on a physical downlink channel from the network device to the user equipment,
a channel state information feedback process that determines parameters related to a protocol for the transmissions, and
radio resource management measurements that monitor signals for a quality of the transmissions;
facilitating transmitting a second notification informing the network device of the reduced group of physical layer operating capabilities, wherein the second notification comprises configuration data representative of a configuration of the reduced group of physical layer operating capabilities; and
facilitating operating the user equipment according to the reduced group of physical layer operating capabilities, wherein the operating comprises receiving the transmissions from the network device, wherein the transmissions are in response to the second notification and reflect compliance by the network device with the reduced group of physical layer operating capabilities determined by the user equipment.

2. The user equipment of claim 1, wherein the reduced group of physical layer operating capabilities are further related to measurements of a channel state information reference signal from a single transmission device, and wherein the channel state information reference signal is received from the network device.

3. The user equipment of claim 1, wherein the reduced group of physical layer operating capabilities are further related to a reduction in a number of transmission layers user in a multiple input multiple output antenna transmission protocol.

4. The user equipment of claim 1, wherein the reduced group of physical layer operating capabilities are further related to a reduction in an amount of bandwidth allocated to the user equipment from the network device.

5. The user equipment of claim 1, wherein the reduced group of physical layer operating capabilities are further related to a reduction of a transmit power of an antenna of the user equipment that is user to transmit data to the network device.

6. The user equipment of claim 1, wherein the reduced group of physical layer operating capabilities are further related to a reduction in a number of blind decoding operations performed by the user equipment.

7. The user equipment of claim 1, wherein the reduced group of physical layer operating capabilities are further related to a reduction in a quantity of radio resource measurements by the user equipment within a period.

8. A network device, comprising:
a processor; and
a memory that stores executable instructions that, when executed by the processor, facilitate performance of operations, comprising:
receiving, from a user equipment, a notification that the user equipment is entering a battery saving mode of operation, wherein the notification comprises configuration data associated with a configuration of reduced physical layer communications procedures;
in response to receiving the notification, facilitating transmitting to the user equipment an acknowledgement of the notification;
determining, without regard to power saving implementation capabilities of the user equipment, the reduced physical layer communications procedures comprising fewer procedures than physical layer communications procedures when the user equipment is not in the battery saving mode of operation, the reduced physical layer communications procedures comprising:
an uplink and downlink procedure applicable to first transmissions via a physical uplink channel from the user equipment to the network device and second transmissions via a physical downlink channel from the network device to the user equipment,
a channel state information feedback procedure for determination of first parameters related to a protocol for the first transmissions and the second transmissions, and
a radio resource management procedure applicable to radio resource management measurements used to monitor signals that relate to a quality of the first transmissions and the second transmissions; and
reconfiguring second parameters to facilitate an activation of the reduced physical layer communications procedures by the network device and at the user equipment.

9. The network device of claim 8, wherein the reduced physical layer communications procedures further comprise a blind decoding procedure that reduces a number of blind decoding operations to be performed by the user equipment.

10. The network device of claim 8, wherein the reduced physical layer communications procedures further comprise a user equipment transmit power procedure that reduces a transmit power of an antenna of the user equipment that is used to transmit data to the network device.

11. The network device of claim 8, wherein the reduced physical layer communications procedures further comprise a radio resource measurement procedure that reduces a quantity of radio resource measurements taken by the user equipment within a period.

12. The network device of claim 8, wherein the channel state information feedback procedure further comprises a reduction in a number of channel state information reference signals sent to the user equipment by the network device.

13. The network device of claim 8, wherein the reduced physical layer communications procedures further comprise a reduction in a number of communication channels used for the first transmissions and the second transmissions.

14. A method, comprising:
  detecting, by a user equipment comprising a processor, a drop in a level of charge of a battery of the user equipment below a threshold;
  in response to the drop in the level of charge, facilitating transmitting, by the user equipment, a notification to a network node device that the user equipment is entering a battery power preservation mode of operation that is to consume less battery power than a standard power mode of operation, and
  receiving, by the user equipment, an acknowledgement from the network node device of the notification;
  facilitating transmitting, by the user equipment to the network node device, a signal comprising a recommendation, which is deniable by the network node device, of first physical layer communications procedures fewer in number than second physical layer procedures that are applicable to the standard power mode of operation, wherein the signal further comprises configuration data representative of the first physical layer communications procedures, the recommendation of the first physical layer communications procedures relating to:
    transmissions via a physical uplink channel from the user equipment to the network node device and via a physical downlink channel from the network node device to the user equipment,
    analysis of channel state information feedback to determine parameters related to a protocol for the transmissions, and
    radio resource management measurements to monitor signals that relate to a quality of the transmissions.

15. The method of claim 14, wherein the signal comprises a radio resource control signal.

16. The method of claim 14, wherein the recommendation of the first physical layer communications procedures comprises, in an error checking protocol, an increase of an amount of time that the network node device waits before sending a request for retransmission of data sent by the user equipment to the network node device.

17. The method of claim 14, wherein the recommendation of the first physical layer communications procedures comprises a transmission protocol that reduces a number of transmission layers used in a multiple input multiple output antenna transmission protocol.

18. The method of claim 14, wherein the recommendation of the first physical layer communications procedures comprises a reduction of a transport block size for the transmissions on the physical uplink channel and on the physical downlink channel, and wherein the transport block size relates to an amount of data determined to be transmitted in a time frame.

19. The method of claim 14, wherein the recommendation of the first physical layer communications procedures comprises a reduction of a bandwidth for the transmissions on the physical uplink channel and on the physical downlink channel, and wherein the bandwidth is representative of a rate at which data is transmitted between the user equipment and the network node device.

20. The method of claim 14, wherein the recommendation of the first physical layer communications procedures comprises a reduction of a number of frequencies that the user equipment monitors for transitions from a first cellular coverage area of a first mobile network cellular site to a second cellular coverage area of a second mobile network cellular site.

* * * * *